(12) United States Patent
Manico et al.

(10) Patent No.: US 6,173,119 B1
(45) Date of Patent: Jan. 9, 2001

(54) CAMERA HAVING RADIO-FREQUENCY IDENTIFICATION TRANSPONDER

(75) Inventors: Joseph A. Manico; Robert W. Spurr, both of Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/372,628

(22) Filed: Aug. 11, 1999

(51) Int. Cl.$^7$ .......................... G03B 17/00; G03B 17/26
(52) U.S. Cl. ............................... 396/6; 396/56; 396/208; 396/210; 396/310; 396/429; 396/512
(58) Field of Search ................ 396/56, 57, 208, 396/207, 210, 311, 321, 310, 429, 511, 512, 6, 300, 319

(56) References Cited

U.S. PATENT DOCUMENTS

| | | | |
|---|---|---|---|
| 4,806,958 | 2/1989 | Momot et al. | 396/208 |
| 5,768,633 | * 6/1998 | Allen et al. | 396/57 X |
| 5,995,768 | * 11/1999 | Kitagawa et al. | 396/208 |

OTHER PUBLICATIONS

Texas Instruments Product Bulletin, Tiris™ Radio Frequency Identification Solutions, "Tag–it™ Inlays", Jan. 1999.

General Reference Manual, Texas Instruments Registration and Identification System, TIRIS Technology by Texas Instruments, "Description of Multipage, Selective Addressable & Selective Addressable (Secured) Transponders", Aug. 23, 1996.

Texas Instruments, Tiris™ Radio Frequency Identification Solutions, "Tiris for Automatic Recognition of Consumers".

Texas Instruments, "Making RFID work for you, An Industry Roundtable Hosted by Texas Instruments at NACS–Tech '98".

Texas Instruments, Tiris™ Radio Frequency Identification Solutions, "TIRIS Automatic Recognition of Consumers: Series 5000 Reader System", 1999.

Reference Manual, Texas Instruments Registration and Identification System, TIRIS Technology by Texas Instruments, "Micro–reader", Jul. 25, 1996.

U.S. application Ser. No. 09/372,329 filed Aug. 11, 1999.
U.S. application Ser. No. 09/372,442 filed Aug. 11, 1999.

* cited by examiner

Primary Examiner—W. B. Perkey
(74) Attorney, Agent, or Firm—Robert Luke Walker

(57) ABSTRACT

A camera has a body, an image capture assembly mounted in the body, and at least one radio-frequency identification transponder mounted within the body, said transponder is unshielded by the body. The transponder can be an inlay transponder.

21 Claims, 12 Drawing Sheets

CAMERA HAVING RADIO-FREQUENCY IDENTIFICATION TRANSPONDER

CROSS REFERENCE TO RELATED APPLICATIONS

Reference is made to commonly assigned, co-pending U.S. patent applications Ser. No. 09/372,287, entitled: FILM UNIT HAVING RADIO-FREQUENCY IDENTIFICATION TRANSPONDER, filed Aug. 11, 1999, in the names of Joseph A. Manico and Robert W. Spurr; Ser. No. 09/371,813, entitled: A MULTISTAGE SYSTEM FOR PROCESSING PHOTOGRAPHIC FILM, filed Aug. 11, 1999, in the names of Christopher Wheeler and Robert W. Spurr; Ser. No. 09/133,114, entitled: A PRINTER WITH MEDIA SUPPLY SPOOL ADAPTED TO SENSE TYPE OF MEDIA, AND METHOD OF ASSEMBLING SAME, filed Aug. 12, 1998, in the names of Robert W. Spurr, Kurt M. Sanger, Babak Tehranchi, and Timothy J. Tredwell; Ser. No. 09/133,122, entitled: A PRINTER MEDIA SUPPLY SPOOL ADAPTED TO ALLOW THE PRINTER TO SENSE TYPE OF MEDIA, AND METHOD OF ASSEMBLING SAME, filed Aug. 12, 1998 in the names of Robert W. Spurr, Kurt M. Sanger, Babak Tehranchi, and Timothy J. Tredwell; Ser. No. 09/218,595, entitled: A PRINTER WITH DONOR AND RECEIVER MEDIA SUPPLY TRAYS EACH ADPATED TO ALLOW A PRINTER TO SENSE TYPE OF MEDIA THEREIN, AND METHOD OF ASSEMBLING THE PRINTER AND TRAYS, filed Dec. 22, 1998 in the names of Robert W. Spurr, Kurt M. Sanger, Babak Tehranchi, and Timothy J. Tredwell; Ser. No. 09/292,859, entitled: A PHOTOPROCESSING APPARATUS FOR SENSING TYPE OF PHOTOPROCESSING CONSUMABLE AND METHOD OF ASSEMBLING THE APPARATUS, filed Apr. 16, 1999 in the names of Robert W. Spurr, Timothy J. Tredwell, L. Dann, and Arthur A. Whitfield; Ser. No. 09/334,021, entitled: AN IMAGING APPARATUS CAPABLE OF FORMING AN IMAGE CONSISTENT WITH TYPE OF IMAGING CONSUMABLE LOADED THEREIN AND METHOD OF ASSEMBLING THE APPARATUS, filed Jun. 16, 1999 in the name of Robert W. Spurr; each of which are assigned to the assignee of this application.

FIELD OF THE INVENTION

The invention relates to photography and cameras and more particularly relates to cameras having radio-frequency identification transponders.

BACKGROUND OF THE INVENTION

For many years, encodements have been provided on film units and cameras for identification purposes and to convey information about the film unit or camera. The term "encodement" is used herein very broadly to cover a feature of physical media used to communicate one or more bits of information to a machine. "Encodement" is inclusive of alphanumeric text and other indicia. For example, Type 135 (35 mm) film cassettes have a "DX" code on the outside surface of the film canister formed by electrically conductive and non-conductive patches. This film also has optical bar codes, in the form of latent images along longitudinal margins of the filmstrip. Advanced Photo System™ film cassettes have magnetic encodements on the film and can have optical encodements identifying print formats. A wide variety of other encodements have been proposed.

A shortcoming is that many of these encodements are permanent once written. For example, electrically conductive patches and latent images do not erase. Other encodements, such as magnetic can be rewritten easily, but reading and writing of the media requires close access to the media. Because of this, such encodements require close access for writing and reading. For example, magnetic encodements require a closely placed magnetic head. Latent images must be photoprocessed. Visible codes must be positioned to be readable and are not easily rewritten, at least for purposes of machine-reading. U.S. Pat. No. 4,806,958 to David Momot and Ensley E. Townsend, discloses a microfilm cassette that has an optical sender and receiver for communicating with similarly configured equipment. The cassette includes a circuit that writes and reads information to electronic memory. The cassette must be registered in a suitable device for reading and writing.

Radio-frequency identification transponders are widely available in a variety of forms. These devices include a non-volatile memory, such as an EEPROM (Electrically Erasable Programmable Read-Only Memory) semiconductor component integrally contained in the transponder. Stored in the non-volatile memory are encoded data. Inlay transponders are identification transponders that have a substantially flat shape. The antenna for an inlay transponder is in the form of a conductive trace deposited on a non-conductive support. The antenna has the shape of a flat coil or the like. Leads for the antenna are also deposited, with non-conductive layers interposed as necessary. Memory and any control functions are provided by a chip mounted on the support and operatively connected through the leads to the antenna. Inlay transponders have been used as layers of identification tags and labels to provide encodements that are accessible at a distance.

It would thus be desirable to provide an improved camera having a radio-frequency identification transponder that can be accessed for writing and reading at a distance.

SUMMARY OF THE INVENTION

The invention is defined by the claims. The invention, in its broader aspects, provides a camera has a body, an image capture assembly mounted in the body, and at least one radio-frequency identification transponder mounted within the body, said transponder is unshielded by the body. The transponder can be an inlay transponder.

It is an advantageous effect of the invention that an improved camera is provided that has a radio-frequency identification transponder that can be accessed for writing and reading at a distance.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
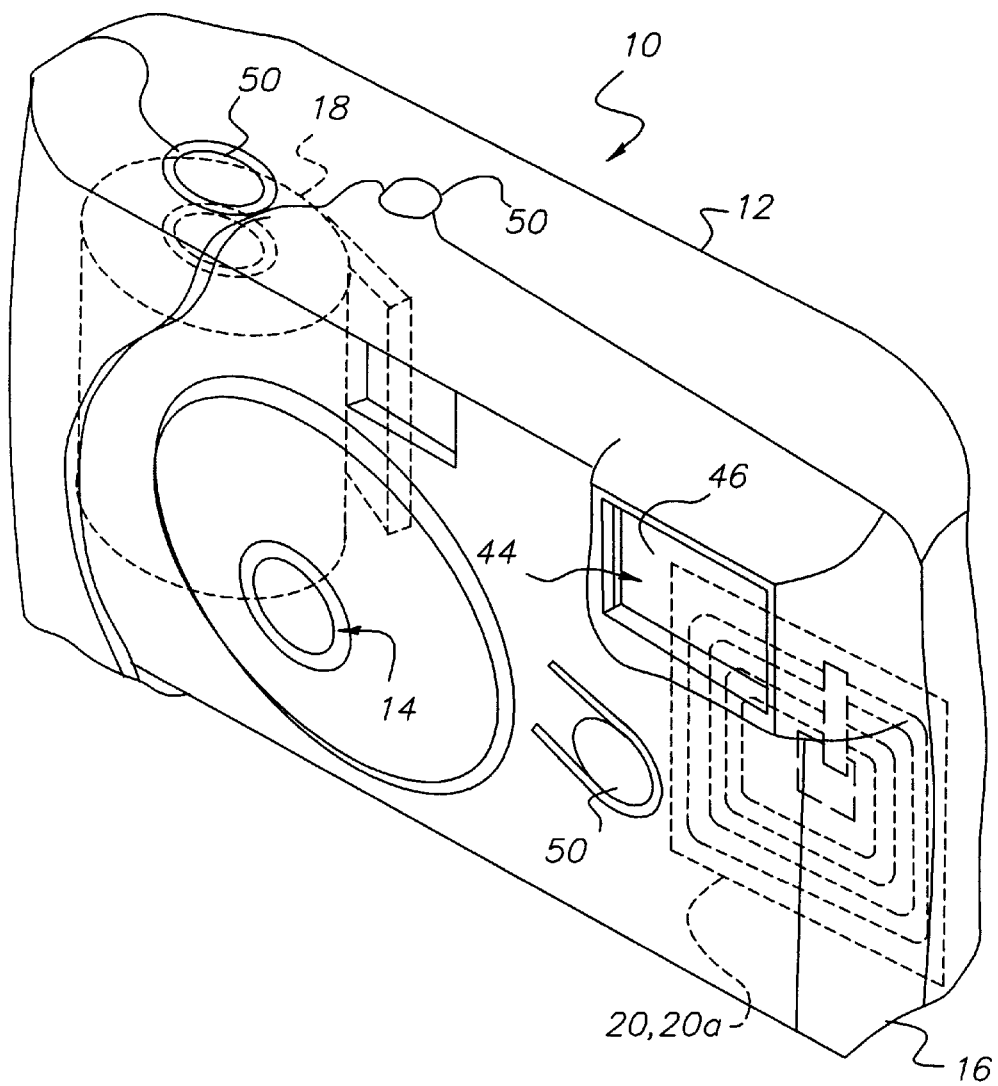
FIG. 1 is semi-diagrammatical perspective view of an embodiment of the camera. The positions of a film cassette and inlay transponder are indicated by dashed lines.

Referring initially to FIGS. 1–4, a camera 10 has a body 12 having an image capture assembly 14 disposed in a casing 16. During use, a film unit or image capture unit 18 is disposed in the body 12 in operative relation to the image capture assembly 14. For convenience, the camera 10 is generally discussed herein in terms of a film unit 18 including photographic film, but it will be understood that the term "image capture unit 18 or film unit 18" is broadly defined and is inclusive of a camera 10 having a film unit 18 that stores information in digital form using electronic, or magnetic, or optical memory or the like.

The body 12 also holds a radio-frequency identification transponder 20. The term "radio-frequency identification transponder" is used herein to refer to any of a class of compact radio receiver-transmitters which are powered by an ambient radio-frequency field (indicated by line pattern 22 in FIG. 2). The transponder 20 is accessed by modulating the field 22 with an appropriate communication signal. The transponder 20 reacts (indicated by arrow 24 in FIG. 2), responsive to the communication signal. The reaction can be a responsive signal or a change in the transponder or both. The content of the communication signal and the response of the transponder 20 are limited by the memory and control functions provided by the transponder and by the access time and bandwidth available for communication. Within those limits, the transponder can be read and written in a manner similar to other digital memory devices used to store and retrieve digital information. For example, multiple separately-accessible memory units can be provided. Access can be unlimited or can be limited by use of one or more access codes for the transponder as a whole, or different codes for each unit. Read and write functions can be provided together or access can be differentiated in some manner. For convenience, the transponder is generally described herein as reacting to a communication signal by transmitting an encodement, earlier programmed in the transponder. It will be understood that such descriptions are not limiting of the possible scope of responses by the transponder. The encodement or encodements in the transponder are limited by practical considerations relating to constraints on the memory in the transponder, available bandwidth and access time. Within these constraints the encodement can vary. For example, the encodement can be uncompressed or compressed data or a pointer to remote data or some combination. Similarly, it will be understood that the communication signal may similarly vary in scope and content.

Figure 6:
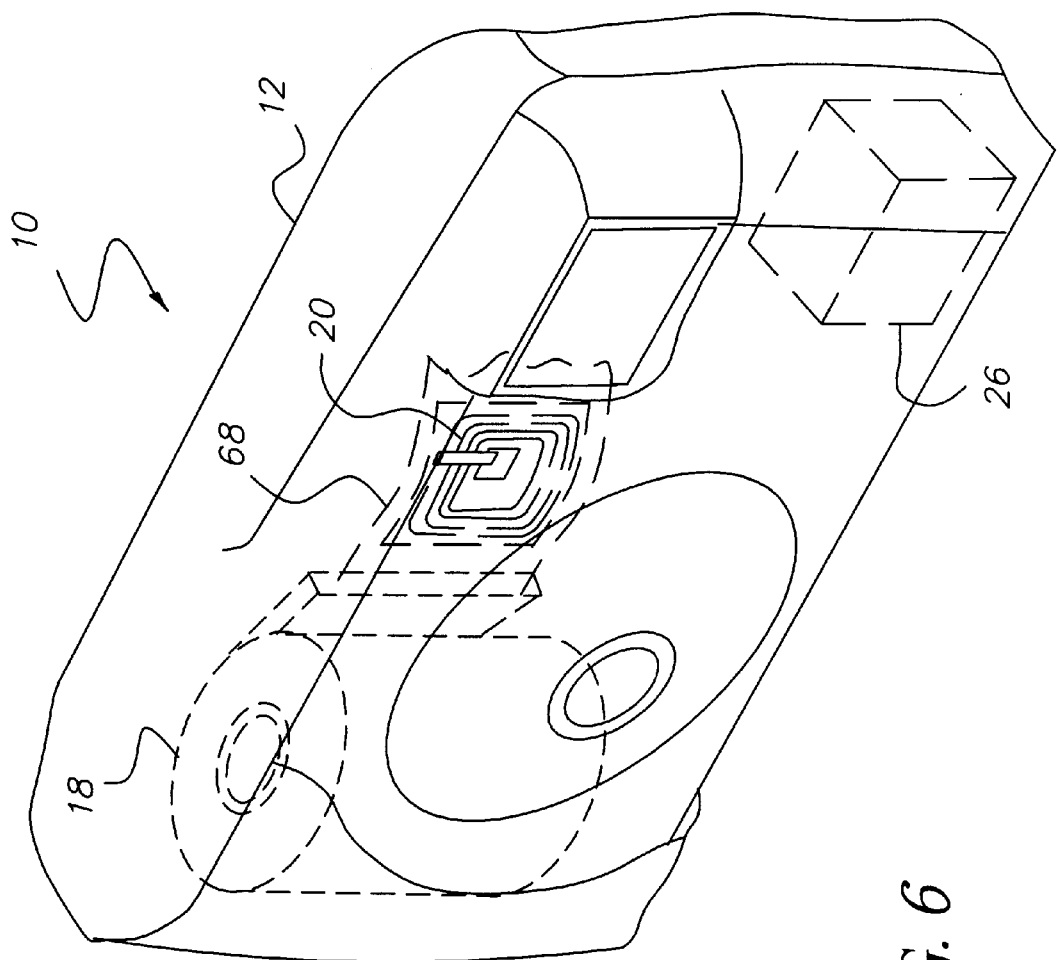
FIG. 6 is a semi-diagrammatical perspective view of still another embodiment of the camera including the inlay transponder of FIG. 3 and a first embodiment of a film unit having an included inlay transponder.

The communication signal 22 is generated and the encodement is detected by a communication unit or transceiver 26. Suitable communication units 26 are well known to those of skill in the art. The communication unit 26 can be provided as part of a kiosk or other fixed structure or can be a handheld device. The communication unit 26 is generally described herein as being provided as separate item external to and discrete from the camera body 12. Referring to FIG. 6, a communication unit 26 can, however, be provided within a single body that also holds the transponder. The components can be configured as necessary to place the communication unit in operative relation with the transponder. For example, a camera body 12 can be enlarged as necessary to accommodate a communication unit 26 and a transponder can be positioned within the body 12 in operative relation to the communication unit 26. A notable advantage of an internal communication unit 26 is that the transponder can be accessed during use to record information related to individual captured images.

The communication unit 26 can access the transponder 20 without direct physical contact or very close proximity to the transponder. The transponder 20 can thus be located in an area of the camera body 12 that precludes direct contact or close positioning. For cameras 10 having photographic film, this allows the transponder 20 to be positioned within a light-tight film enclosure 19 that holds the film. In this case, the transponder can still be accessed, even though the transponder is isolated from light-exposure along with the film. The transponder 20 is retained in the camera 10 during use and does not degrade the usage of the image capture assembly 14.

Figure 2:
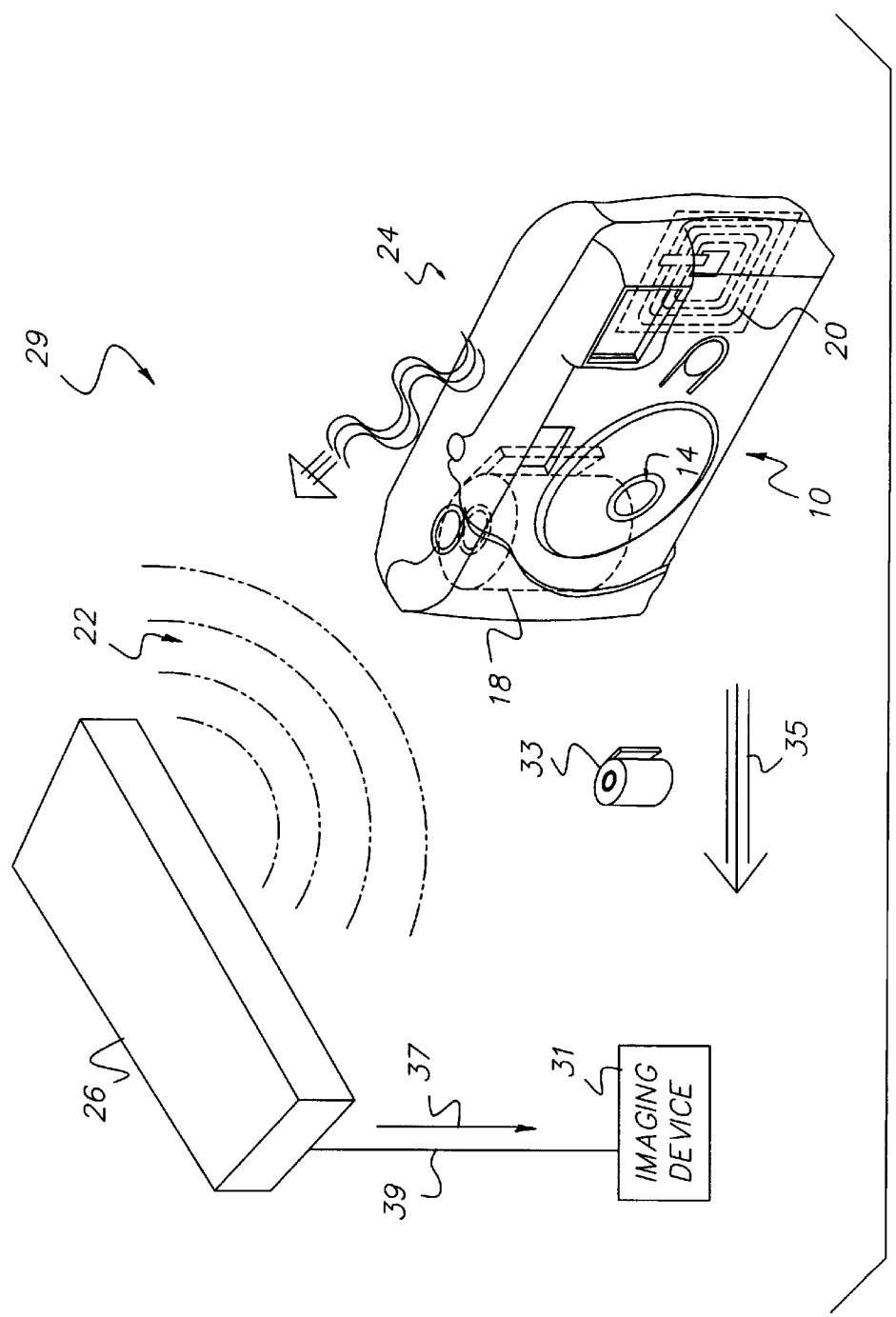
FIG. 2 is a diagrammatical view illustrating use of the transponder in the camera of FIG. 1 in an embodiment of the imaging system.

Referring to FIG. 2, in an imaging system 29, the transponder 20 in the camera 10 transmits an encodement signal 24 of camera related information responsive to a radio-frequency communication signal 22 from the communication unit 26. Image information captured by the image capture assembly 14 is sent by suitable transfer equipment to an imaging device 31. (In FIG. 2, the image information is indicated by a small image of a film unit having the reference number 33 and the transfer equipment is indicated by an arrow 35.) The encodement or ancillary information derived from the encodement (indicated by arrow 37) is sent on a communication path 39 by the communication unit 26, responsive to the encodement signal 24, to the imaging device 31. The imaging device 31 then provides an output (not shown) responsive to the image information and the ancillary information.

The term "imaging device" is used very broadly here to refer to any unit or units or system of equipment that process, modify, store, print, or display images and are capable of varying output on the basis of ancillary information received. "Imaging device" is inclusive of digital and conventional photofinishing equipment in all forms and includes developing equipment, scanners, viewers, and printers.

The transfer equipment varies with the imaging device. For example, if the imaging device produces printed images from latent images captured on film, then the transfer equipment can be related to physical transport of the film having the latent images. On the other hand, if the imaging device produces digitally stored images from digital data recorded in a digital film unit, then the transfer equipment can be directed to the transport of signals bearing digital image information. This can be varied in a wide variety of ways. For example, digitial images can be transferred by shipping physical storage media. Photographic or other physical images can be digitized and transferred by use of electronics or other signal transmission equipment. Combinations of equipment can be used and the captured images can be changed in form, modified, edited, combined, or otherwise manipulated in any combination.

The ancillary information can also vary widely. For example, the ancillary information can be set-up parameters for a photofinishing device, a product selection or selection of product features, a modification of captured images in some manner, information for inclusion in or with a photofinishing product, or a request for or modification of optional services. Within memory limits, the ancillary information can be the same encodement provided by the transponder. Limitations on memory in the transponder can alternatively be circumvented by use of small encodements that point to larger, separately stored units of information in local or remotely accessed look-up tables or databases or the like. For example, an encodement could include or point to a URL (universal resource locator) to provide access to an Internet site.

Describing now a specific example, a transponder 20 can be written with an encodement containing or pointing to a remote memory unit containing owner information and photofinishing preferences. Images are then captured in the form of latent images on film within the camera. The camera and film are then brought to an communication unit 26, that is part of is part of a kiosk or other film input station at which the film is submitted for processing. The transponder 20 is accessed by the communication unit, which then sends the respective ancillary information to an image device in the form of a photofinishing unit. The kiosk or other device can transmit the encodement digitally or by other means and modify photofinishing activities responsive to the information. The images are processed in accordance with the preferences and delivered in accordance with the owner information.

Further details of the imaging system are disclosed in U.S. Patent Application Serial No. 09/371,813, entitled: A MULTISTAGE SYSTEM FOR PROCESSING PHOTOGRAPHIC FILM, filed Aug. 11, 1999, and filed in the names of Christopher Wheeler and Robert W. Spurr which is hereby incorporated herein by reference.

It is highly preferred that the transponder 20 is a unitary structure that includes any and all necessary antenna or antennas. The transponder 20 can have any configuration, within the spatial constraints imposed by the camera 10. It is preferred, however, that the transponder 20 is an inlay transponder 20a. The term "inlay transponder 20a" is used herein to refer to a radio-frequency identification transponder that has a flexible support sheet 28 bearing a planar antenna 30 and integrated circuit chip 32. Connectors 34 join the circuit chip 32 and antenna 30 and one or more insulation layers or coverings (not separately illustrated) are provided as necessary. The thickness of an inlay transponder 20a is less than 20 times the smallest dimension of the circuit chip 32 and is, preferably, less than 10 times the smallest dimension of the circuit chip 32 and less than the largest dimension of the circuit chip 32, and more preferably is less than 3 times the smallest dimension of the circuit chip 32. The inlay transponder 20a can be bent, in one or more directions, within limits imposed by the adherence of the circuit chip 32, connectors, and antenna 30 to the support sheet 28.

In a currently preferred embodiment, the support sheet 28 is electrically insulating plastic and the antenna 30 is a layer of conductive material deposited on the support sheet 28. Inlay transponders 20a of this type are marketed by Texas Instruments Incorporated, of Dallas, Tex., as Tag-it™ Inlays. In a specific example of such an inlay transponder 20a, the antenna 30 has, in its larger dimensions, has roughly the form of a rectangular helix 45 mm by 45 mm. The helix has 10 turns and a transverse dimension from inner turn to outer turn of about 11 mm. Connectors 34 and necessary insulation are also provided as deposited layers. The circuit chip 32 is small, having larger dimensions of roughly 1 mm by 1 mm, and is bonded to the support sheet 28 in operative contact with the connectors 34. The inlay transponder 20a can be bent about a radius of 15 or 30 mm depending upon the orientation of the circuit chip 32 on the outside or inside of the curve, respectively.

Figure 4:
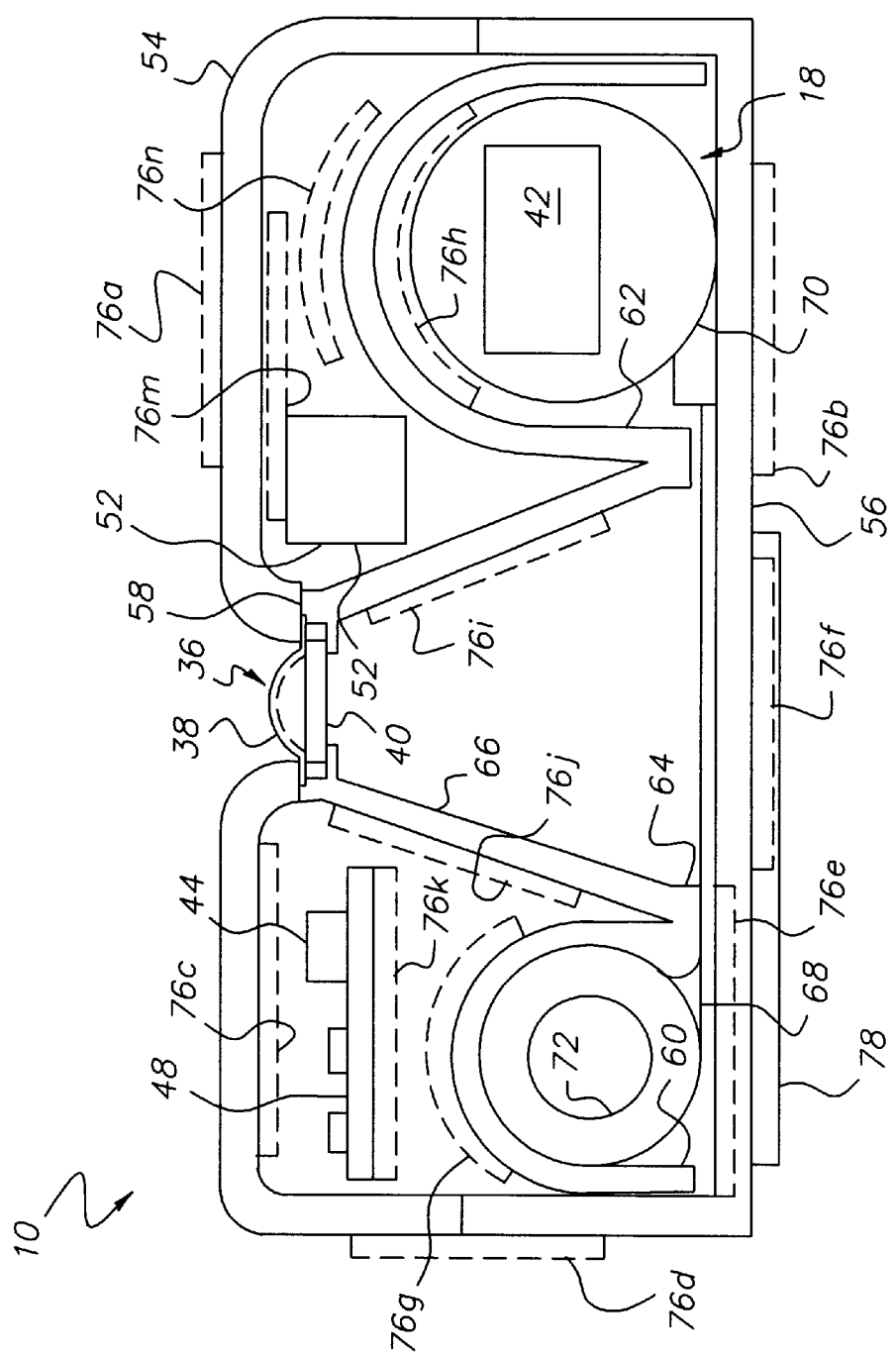
FIG. 4 is a semi-diagrammatical cross-sectional view of another embodiment of the camera. Some of the alternative locations for an inlay transponder are indicated by dashed lines.

The image capture assembly 14 includes conventional camera components, such as a taking lens unit 36 having one or more lens elements 38, a shutter unit 40, and a film transport (indicated in FIG. 4 by a rectangle 42). The image capture assembly 14 can also include a flash assembly 44 including a lamp unit 46 and a circuit board 48 electrically connected to a flash tube (not shown) within the lamp unit 46. The image capture assembly 14 has control features 50, such as a shutter release, flash charging button, counter, and viewfinder, positioned at the surface of the casing 16 for access by the user during picture taking. The image capture assembly 14 can also include one or more other conventional camera components (symbolized by box 52 in FIG. 4), such as a timer, a control display, a date-back, and the like.

The casing 16 includes the structural elements of the camera 10. The various parts of the image capture assembly 14 are disposed within the casing 16 and can be firmly mounted to one or more members of the casing 16 or can be trapped in place by casing members. In the cameras 10 shown in the figures, the casing 16 has front and rear covers 54,56 and a frame 58 enclosed within the cover members 54,56. The frame 58 has first and second film chambers 60,62, an exposure chamber 64 between the film chambers 60,62, and a baffle 66 directing light from the taking lens unit 36 to the exposure chamber 64.

The cameras 10 illustrated are one-time use cameras. In these cameras, a filmstrip 68 is prewound out of a holder 70 of the film unit 18 during manufacture to form a film roll 72. During use, the filmstrip 68 is moved by the film transport 52 on a frame-by-frame basis through the exposure chamber 64, for picture taking, and back into the holder 70. Features of the film unit 18 and film related mechanisms are not critical. For example, the film unit 18 can have a one chambered holder or patrone 70, as in Type 135 (35 mm) and Advanced Photo System film units. The film unit 18 can have a two chambered holder 70, as in Type 110 film units. The film unit 18 can have a holder 70 that is only a spool, as in Type 120 film units. The film unit 18 can be prewound in the camera 10 or can require rewinding. The filmstrip 68 can be moved from one spool to another during use or from a film roll to a spool or from film roll to film roll without any spools. The holder 70 can include a canister and internal spool, as in the figures, or the holder can be a canister lacking a spool.

Figure 5:
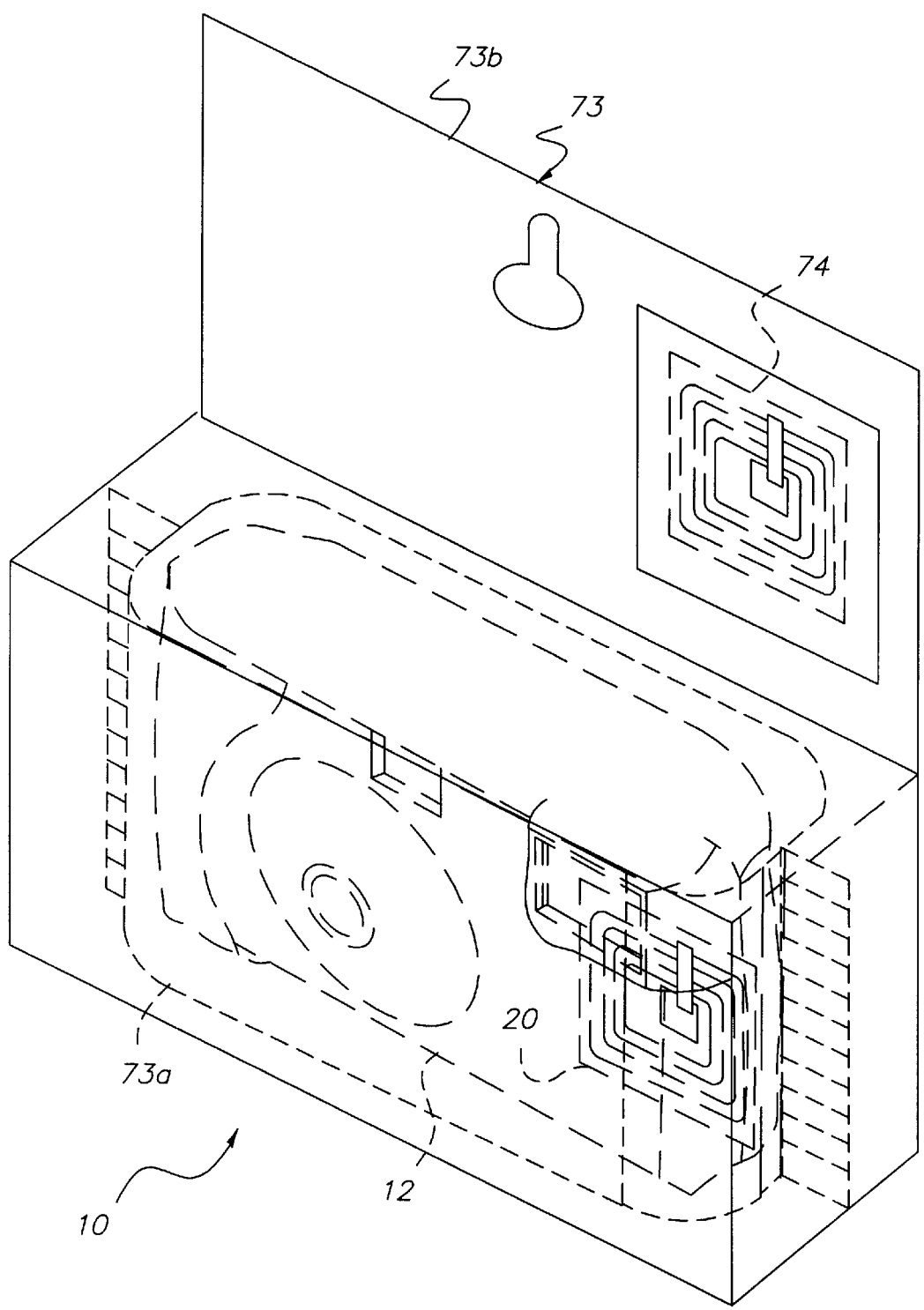
FIG. 5 is a semi-diagrammatical perspective view of the camera of FIG. 1 modified by the addition of packaging.

Referring now particularly to FIG. 5, the camera 10 can have packaging 73 surrounding the body 12, in the manner that packaging is commonly provided for products prior to sale to a final user. The packaging 73 is removable and is removed to use the camera 10. With a one-time use camera 10, the packaging 73 is waterproof to protect the filmstrip in the camera 10 from humidity. The manner of packaging can vary widely. FIG. 5 illustrates packaging 73 in the form of a waterproof plastic or foil laminate inner bag 73a in combination with an outer non-waterproof hanger-box 73b. The packaging 73 can include a supernumerary transponder 74 as a security device or for inventory control or the like. The supernumerary transponder 74 is independent of the transponder 20 in the camera body 12, and is part of the packaging 73 rather than the camera body 12.

Figure 3:
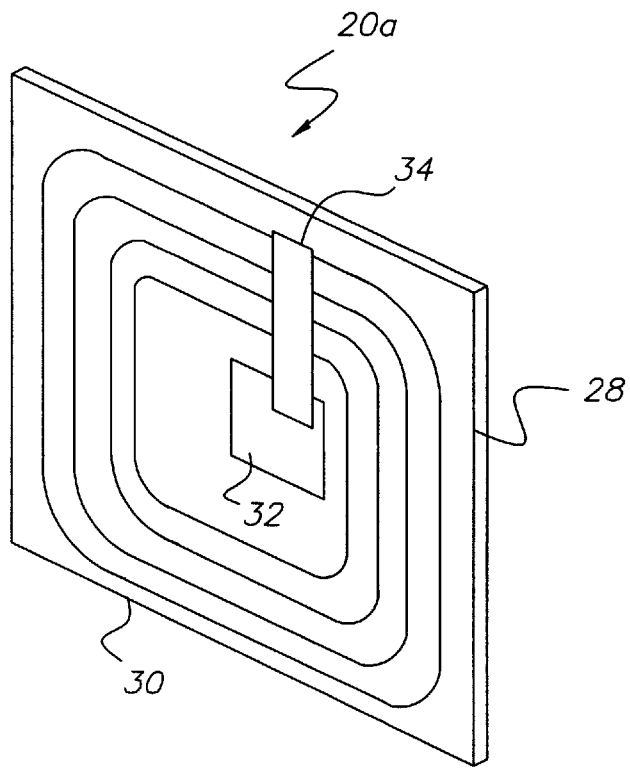
FIG. 3 is a semi-diagrammatical perspective view of the inlay transponder of FIG. 1.
Figure 8:
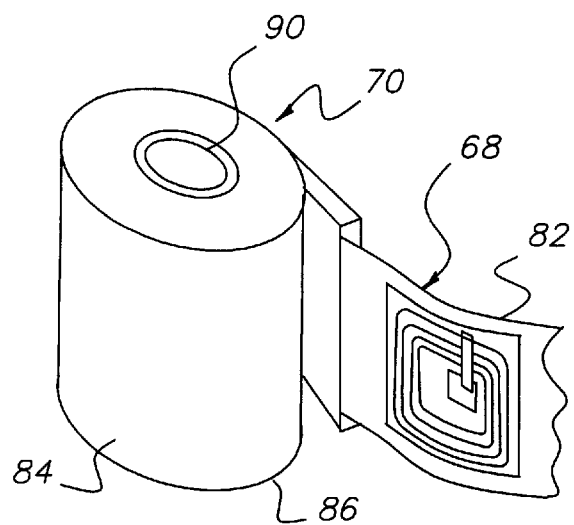
FIG. 8 is a semi-diagrammatical perspective view of the film unit of FIG. 6.

Referring now particularly to FIGS. 3–5, the transponder 20 can be joined to the body 12 of the camera 10. To protect against loss of information, it is highly preferred that the transponder 20 is inseparable from the body 12 without disassembly of the camera 10 or damage to the camera 10. The transponder 20 can be mounted to the casing 16 or the image capture assembly 14 and can be external or internal to the body 12. Attachment of the transponder 20 to the body 12 can be provided by fasteners, but adherence using a layer of adhesive or solvent welding or the like is generally preferred. The transponder 20 is positioned such it is unshielded by the body 12. In other words, the body 12 does not block transmission of appropriate radio frequency signals to and from the transponder 20. It is preferred that the transponder 20 be unshielded in all directions, however, shielding can limit signal transmission in one or more directions, if desired. In view of this matter of shielding, it is preferred that the casing 16 be made of plastic or other radio-frequency signal transmissive material.

The transponder 20 can be positioned in a variety of locations in the body 12. This is particularly the case when the transponder 20 is an inlay transponder, since the inlay transponder is thin and can be bent. Some alternative locations for an inlay transponder 20a are illustrated in dashed lines and reference designations beginning with "76", in FIG. 4. The inlay transponder 20a can be mounted at 76a (on the outside surface of the front cover 54), at 76b (on the outside surface of the rear cover 56), at 76c (on the inside surface of the front cover 54), or at 76d (on the outside surfaces of front and rear covers 54,56 overlapping the joint between the two covers 54,56). The inlay transponder 20a can be mounted at 76e (in a recess in the inside of the rear cover 56 or a similar recess in another part). The inlay transponder 20a can be mounted at 76f (attached to an adhered label 78). To protect against damage or inappropriate removal, the inlay transponder 20a is preferably mounted internally within the body 12 of the camera 10. The inlay transponder 20a, as noted above, can be mounted on an inside surface of a cover. The inlay transponder 20a can also be attached to the frame 58. FIG. 4 illustrates examples of locations on the frame 58, including 76g (the outer surface of a film chamber 60,62), 76h (the inner surface of a film chamber 60,62), 76i (an inner surface of the baffle 66), and 76j (an outer surface of the baffle 66). As is apparent from FIG. 4, the inlay transponder 20a can be mounted to a flat surface or a curved surface and can bridge different parts of the camera 10. The inlay transponder 20a can be attached to one or more components of the image capture assembly 14. FIG. 4 illustrates a location, 76k, for attachment of an inlay transponder 20a to the circuit board 48 of the flash assembly 44. The inlay transponder 20a can be partially attached to a component or part, and partially free; or can be completely unattached, and simply trapped within the camera body 12 as shown at 76m and 76n, respectively.

Figure 7:
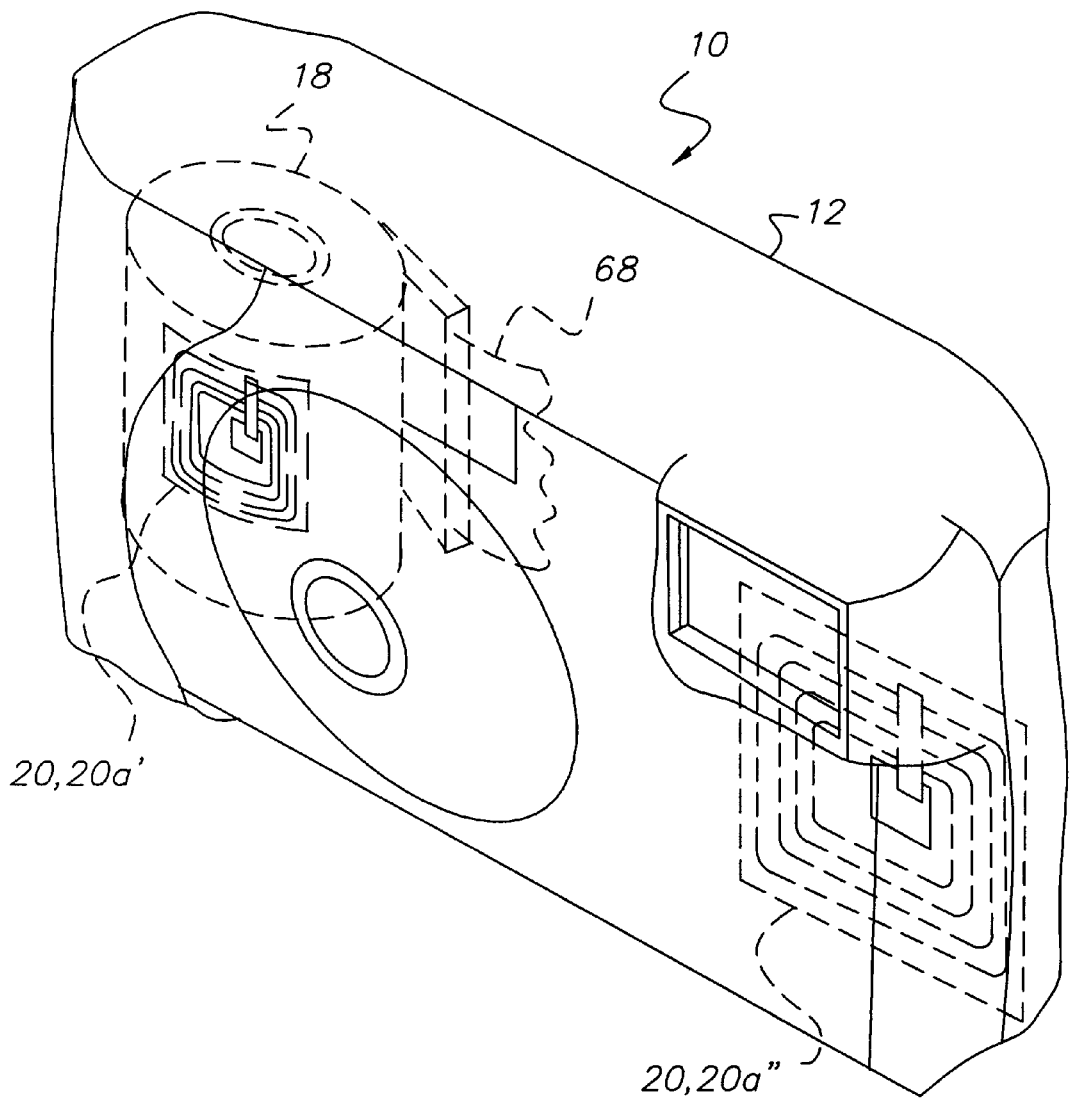
FIG. 7 is a semi-diagrammatical perspective view of yet another embodiment of the camera including the inlay transponder of FIG. 3 and a second embodiment of a film unit having an included inlay transponder.
Figure 16:
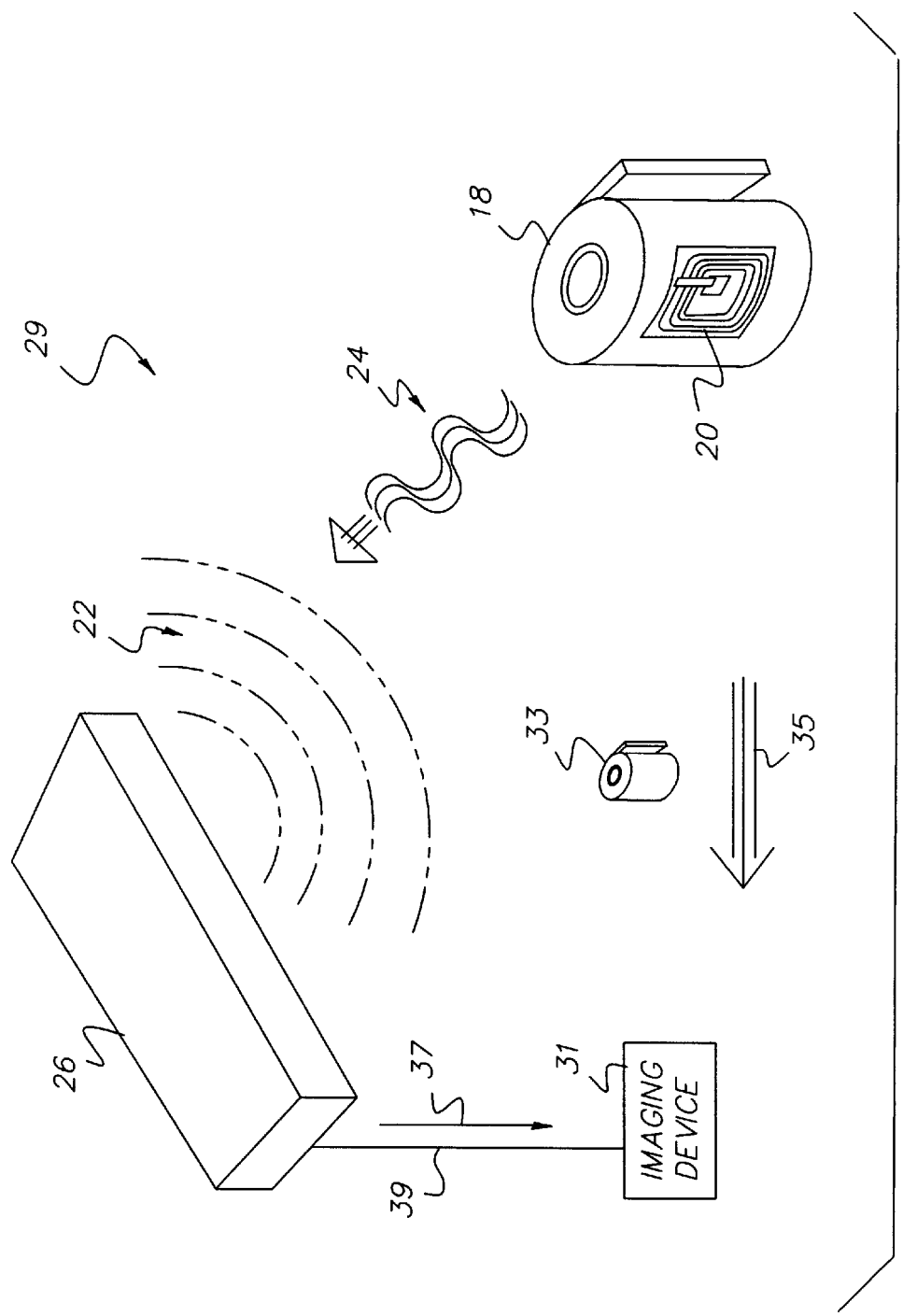
FIG. 16 is a diagrammatical view illustrating use of the transponder in the film unit of FIG. 9 in an embodiment of the imaging system.

Referring now particularly to FIGS. 6–7, the camera 10 can have a transponder 20 held by the film unit 18 in the camera body 12. The transponder 20 in the film unit 18 is unshielded by both the film unit 18 and the body 12. An embodiment of the system 29, shown in FIG. 16, is comparable to the system 29 previously described, except that the camera 10 is replaced by the film unit 18. The film unit 18 can also be returned to the user following processing, for example, by return of the developed filmstrip 68a within the film canister 86, as with Advanced Photo System film. In that case, the transponder can be retained to allow use of the transponder by the user and and/or in subsequent photofinishing. With the camera or the film unit, multiple transponders can also be used as necessitated by multiple photofinishing products and information can be transferred from one transponder to another as needed. As is the case with the camera 10 of FIG. 2, the film unit 18 can be varied in accordance with the disclosure herein, as desired.

Referring now particularly to FIG. 7, the camera 10 can also have a first transponder 20' held by the film unit 18 and a second transponder 20" held by the body 12 independent of the film unit 18. This approach has the advantage that encodements related to captured image, such as image format can more easily be retained with the images and encodements related to the camera body 12, such as the number of times a one-time use camera 10 has been recycled, can be retained with the recycled part of the camera body 12. The two transponders 20',20" can be used to store the same encodements or different encodements. The two transponders 20 can be commonly accessible on the same radio frequencies, but are preferably independently accessible. The camera 10 can also have a plurality of transponders 20 (not illustrated) separate from the film unit 18, but, for current embodiments, this is superfluous and not preferred.

Referring now particularly to FIGS. 6–15, it is currently preferred that a transponder 20 held by a film unit 18 is an inlay transponder, since an inlay transponder is readily compatible with spatial constraints of a film unit 18. An inlay transponder 20a can be mounted to the film or to a holder 70 of the film unit 18. The transponder 20 can be adhered or otherwise attached or disposed in the film unit 18 in the same manner as previously described for the camera body 12. The film unit 18 is illustrated as a patrone in which the holder 70 is a canister including an internal spool and the filmstrip is attached to and wound around the spool, but the film unit 18 is not limited to any particular configuration. For example, the film unit 18 can have a single film chamber, as in a Type 135 (35 mm) or Advanced Photo System™ cassette, or the film unit 18 can have two film chambers, as in a Type 110 cassette, or the film unit 18 can have film wound on a bare spool, as in Type 120 and Type 220 films, or the film unit 18 can be an unspooled length of filmstrip.

The holder 70 can shield the transponder 20 from radio-frequency communication by the communication unit 26, except in one or a limited number of directions or except in some conditions such as opening of an access door or outward extension of the transponder 20. It is preferred, however, that the transponder 20 be continuously accessible and be accessible in any direction.

The transponder 20 can be mounted to the outer, light-blocking surface 80 of a film unit 18, such as the exterior of a light-tight holder 70, or can be mounted interior to that surface 80 within a film area 81 protected from incidental light exposure. In the latter case, the transponder is isolated from light-exposure in the same manner as the film. In either case, the transponder 20 can be accessed without direct contact or close positioning of the communication unit 26. The transponder 20 can thus be accessed even when direct contact or close access to the film unit would be unsuitable, such as during use, when film is unwound from a light-tight holder 70 within a camera.

If mounted to the film, it is preferred that the inlay transponder 20a is mounted to a filmstrip end (leader or trailer) 82. The inlay transponder 20a can be cut from the filmstrip and handled separately during film finishing or can be subject to the same photofinishing processes as the remainder of the filmstrip. In the latter case, the filmstrip must have materials and a configuration that precludes unacceptable contamination of photofinishing solutions.

Figure 9:
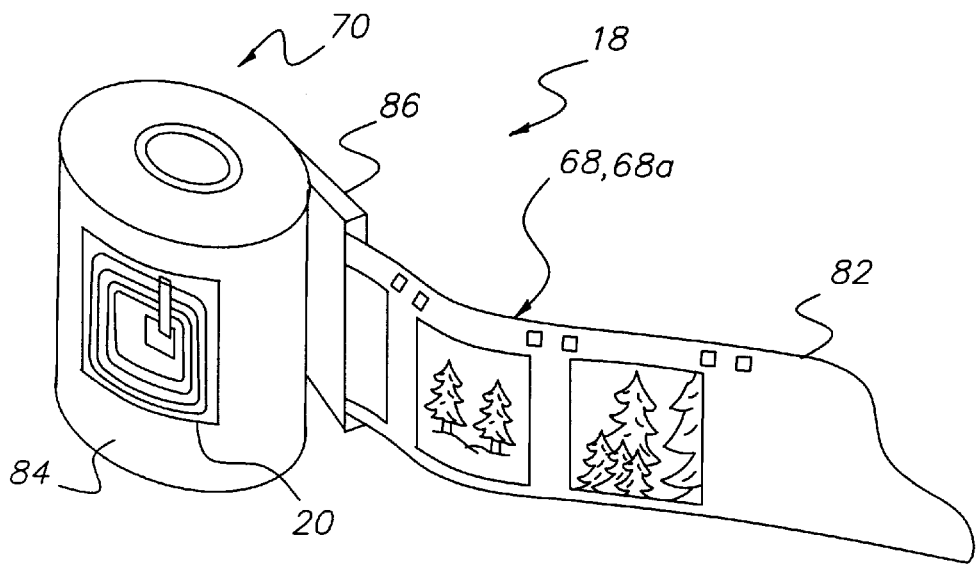
FIG. 9 is a semi-diagrammatical perspective view of the film unit of FIG. 7, but following photofinishing including development of the filmstrip. The developed filmstrip is illustrated partially extended to show the visible captured images.
Figure 11:
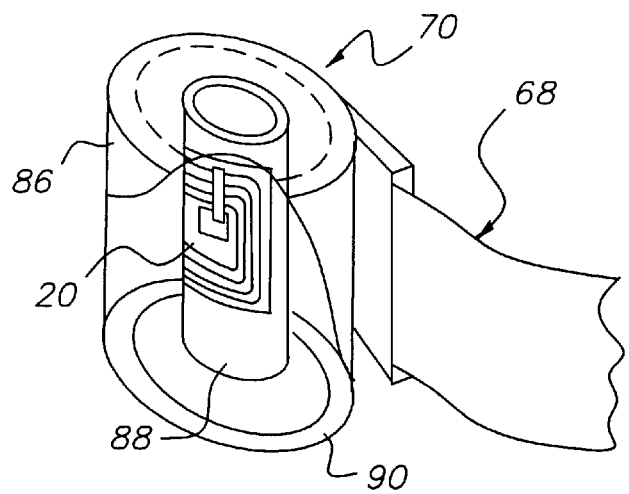
FIG. 11 is a partially cut-away, semi-diagrammatical perspective view of a third embodiment of the film unit. The location of the upper spool flange is indicated by a dashed line.
Figure 12:
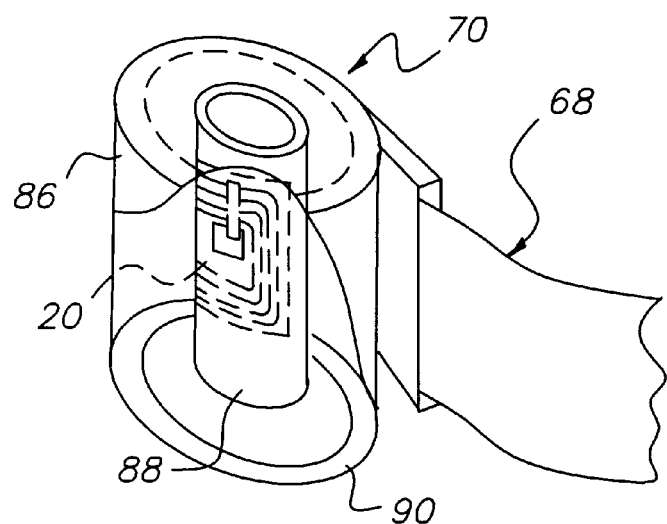
FIG. 12 is a partially cut-away, semi-diagrammatical perspective view of a fourth embodiment of the film unit. The locations of the upper spool flange and inlay transponder are indicated by dashed lines.
Figure 15:
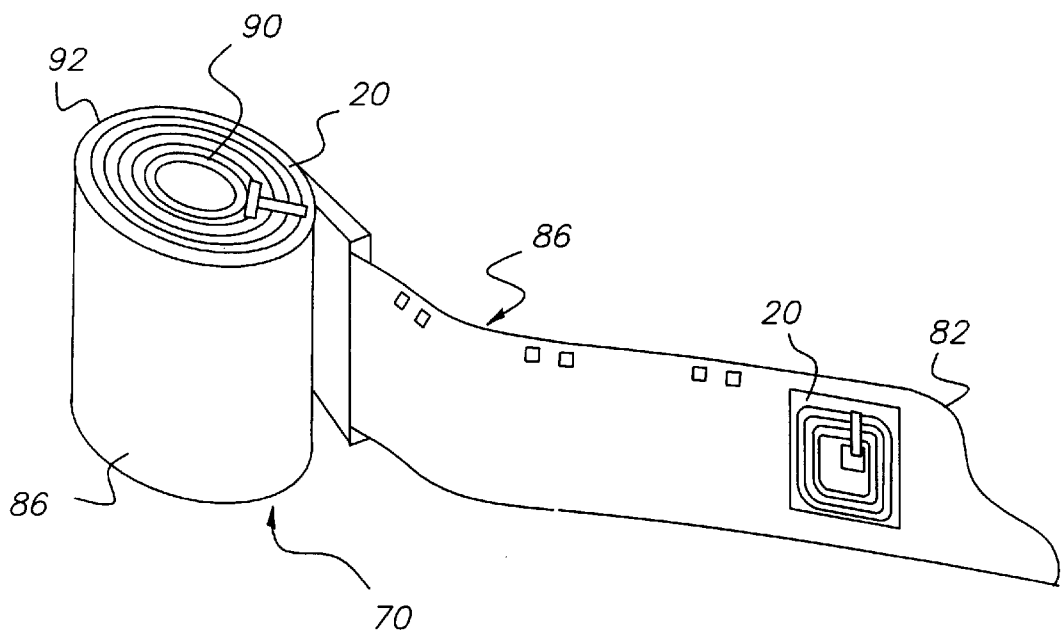
FIG. 15 is a semi-diagrammatical perspective view of a seventh embodiment of the film unit.

The transponder 20 can also be mounted to the holder 70 on an exterior or interior surface. FIG. 9 illustrates an inlay transponder 20a joined to the exterior surface of a sidewall 84 of a canister 86. FIGS. 11 and 12 illustrate inlay transponders 20a joined to outer and inner surfaces, respectively, of the core 88 of a spool 90. FIG. 15 illustrates a transponder 20 joined to the exterior surface of an endwall 92 of a canister 86.

A transponder 20 mounted to the film or holder 70 can be permanently affixed by adhesive or the like, or removable. The desirability of permanent or removable mounting depends upon the location of the transponder 20 and the photofinishing procedures to be used. A removable transponder 20 has the advantage that it can be transferred during photofinishing from a discarded item, such as the canister of a Type 135 film unit, to a photofinishing product, such as an index print. A permanently mounted transponder 20 is free from a risk of accidental removable, but requires retention of a supporting structure, such as an original filmstrip or canister.

Figure 10:
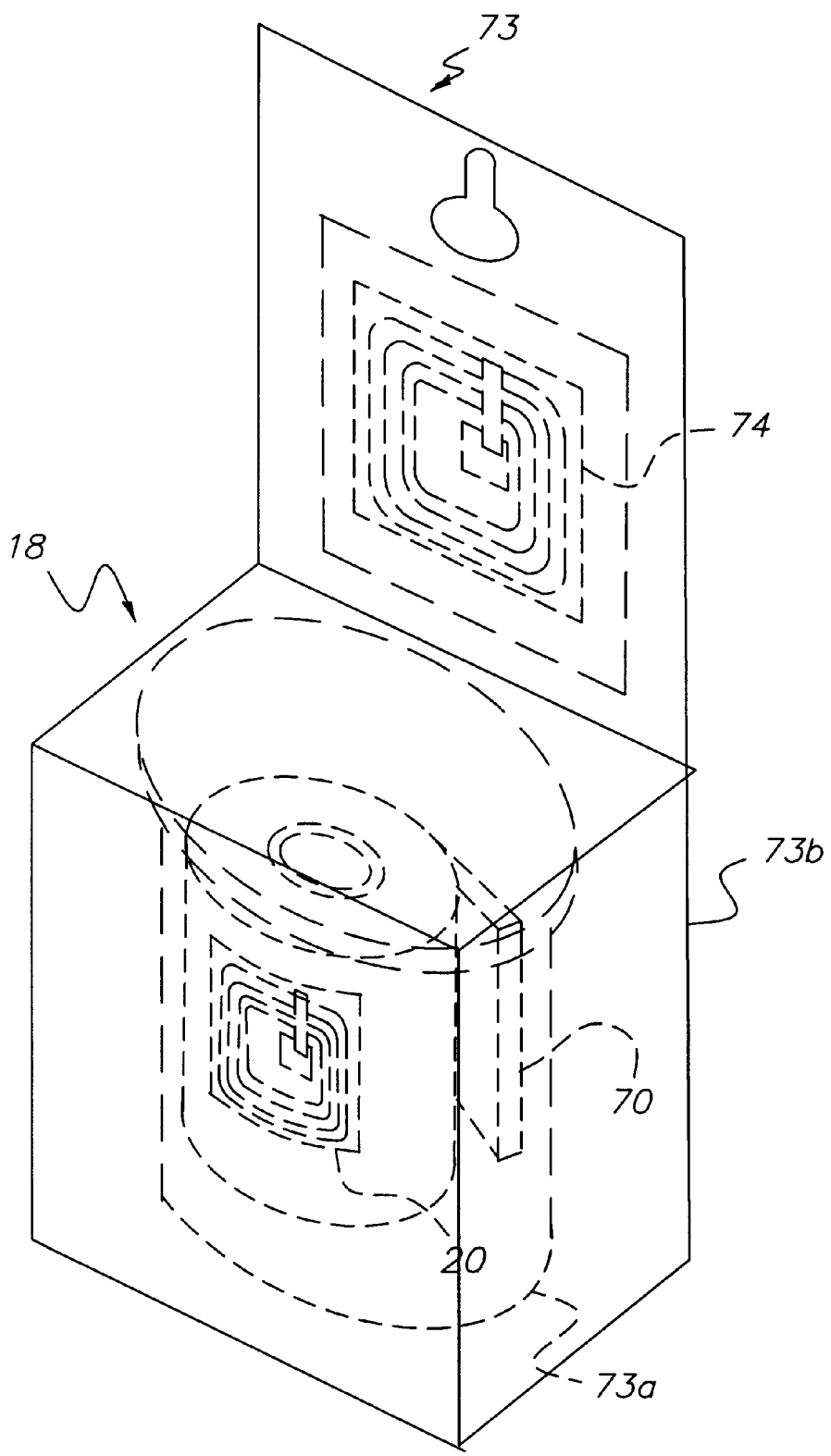
FIG. 10 is a semi-diagrammatical perspective view of the film unit of FIG. 9 modified by the addition of packaging.

Referring now particularly to FIG. 10, the film unit 18 can have packaging 73 enwrapping the film and holder 70, if any; in the manner that packaging is commonly provided for products prior to sale to a final user. The packaging 73 is removable and is removed for use. To protect film, the packaging 73 is preferably waterproof to protect against humidity. The manner of packaging can vary widely. FIG. 10 illustrates packaging 73 in the form of a waterproof inner container 73a in combination with an outer non-waterproof hanger-box 73b. The packaging 73 can include a supernumerary transponder 74 as a security device or for inventory control or the like. The supernumerary transponder 74 is independent of the transponder 20 in the film unit 18, and is part of the packaging 73 rather than the film unit 18.

Figure 13:
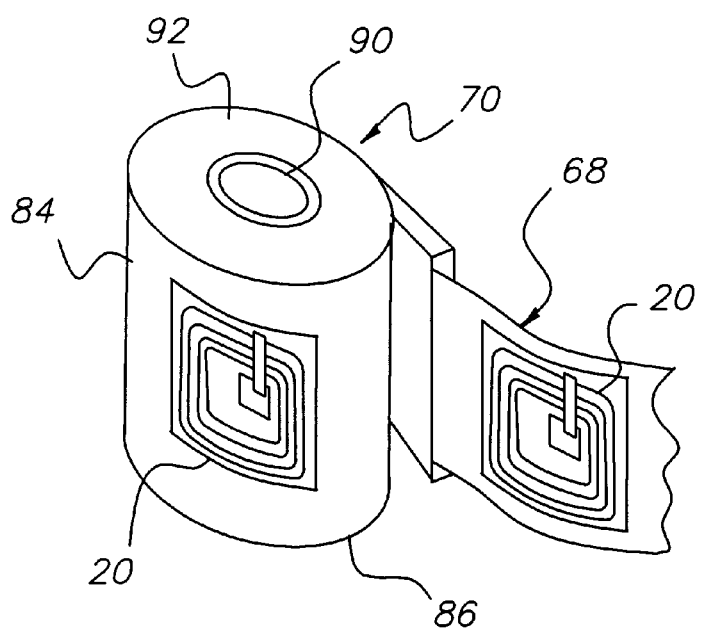
FIG. 13 is a semi-diagrammatical perspective view of a fifth embodiment of the film unit.
Figure 14:
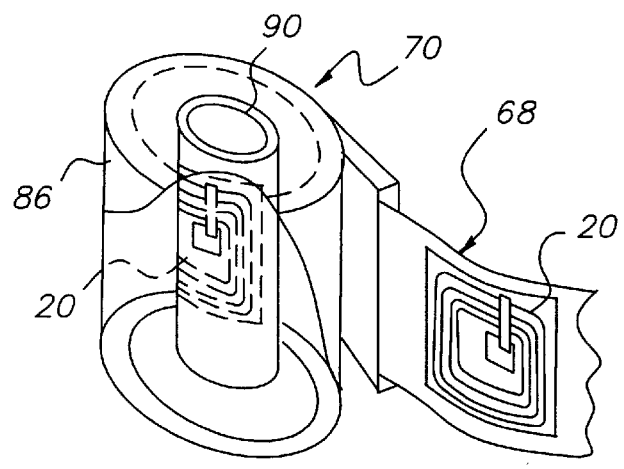
FIG. 14 is a semi-diagrammatical perspective view of a sixth embodiment of the film unit. The locations of the upper spool flange and inlay transponder are indicated by dashed lines.

Referring now to FIGS. 13–15, the film unit 18 can have more than one transponder 20. For example, two transponders 20 can be used to store the same encodements for redundancy or as an aid in matching separated canisters 86 and respective filmstrips 68 during photofinishing. Multiple transponders 20 can also be used to provide more storage capacity than would be possible with a single transponder 20. In that case, each of the plurality of transponders 20 would store different encodements. The two transponders 20 can be commonly accessible on the same radio frequencies, but are preferably independently accessible. The camera 10 can also have one or more transponders 20 in the body 12 that are independent of the transponders 20 held by the film unit 18.

The invention has been described in detail with particular reference to certain preferred embodiments thereof, but it will be understood that variations and modifications can be effected within the spirit and scope of the invention.

What is claimed is:

1. A camera comprising:
   a body;
   an image capture assembly mounted in said body; and
   a radio-frequency identification inlay transponder mounted within said body, said inlay transponder being unshielded from radio-frequency radiation by said body and continuously accessible to radio-frequency communication.

2. The image capture unit of claim 1 wherein said transponder is permanently affixed to said body.

3. The image capture unit of claim 1 further comprising removable packaging surrounding said camera external to said transponder.

4. The camera of claim 1 wherein said transponder is adhered to said body.

5. The camera of claim 1 wherein said body includes a frame assembly and front and rear covers closing said frame assembly, and said transponder is mounted to said frame assembly.

6. The camera of claim 1 wherein said body includes a flash unit and said transponder is mounted to said flash unit.

7. The camera of claim 1 wherein said body has a light-tight film enclosure and said transponder is mounted within said film enclosure.

8. A camera comprising:
   a body;
   a film unit disposed in said body for image capture; and
   a radio-frequency identification transponder associated with said film unit, said transponder being operable independent of said image capture.

9. The camera of claim 8 wherein said transponder is mounted to said film unit.

10. The camera of claim 8 wherein said body includes a film exposure system that is operative without removal of said transponder.

11. The camera of claim 8 wherein said transponder is an inlay transponder.

12. The camera of claim 11 wherein said inlay transponder is adhered to said film unit.

13. The camera of claim 11 wherein said film unit has a canister and a filmstrip attached to said canister and said inlay transponder is mounted to said canister.

14. The camera of claim 11 wherein said film unit includes a filmstrip and said inlay transponder is mounted to said filmstrip.

15. The camera of claim 8 further comprising removable packaging surrounding said body external to said transponder.

16. The camera of claim 15 wherein said packaging is waterproof and fully encloses said body.

17. A one-time use camera comprising:
   a body;

a first radio-frequency identification transponder mounted to said body;

a film unit disposed in said body;

a second radio-frequency identification transponder mounted to said film unit.

18. The one-time use camera of claim 17 wherein at least one of said transponders is an inlay transponder.

19. The one-time use camera of claim 17 wherein said radio-frequency identification transponders are inlay transponders.

20. The one-time use camera of claim 17 wherein said second transponder is permanently affixed to said film unit.

21. An imaging system comprising:

a camera including:

a body;

an image capture assembly mounted in said body; and a radio-frequency identification inlay transponder mounted to said body, said transponder being operable independent of said image capture assembly;

an imaging unit;

transfer equipment sending said image information from said image capture assembly to said imaging unit; and a communication unit accessing said transponder by radio-frequency communication and sending said ancillary information to said imaging unit.

* * * * *